3,394,992
POLYMERIC ARSENIC COMPOUNDS
John R. Van Wazer, Ladue, and Kurt Moedritzer, Webster Groves, Mo., assignors to Monsanto Company, St. Louis, Mo., a corporation of Delaware
No Drawing. Filed Dec. 31, 1964, Ser. No. 422,549
19 Claims. (Cl. 23—203)

ABSTRACT OF THE DISCLOSURE

The present invention relates to novel, polymeric substituted arsenic compounds containing oxygen or sulfur. The compounds have the general composition $(AsY_{x/2}X_y)_m$ where $x$ and $y$ are positive numbers, $m$ is an integer from 2 to 1,000, and $x+y=3$. In the above formula Y is selected from the group consisting of oxygen and sulfur, X is a radical selected from the group consisting of halogens, alkoxy radicals, —OR; dialkyl amine radicals, —$NR_2$; and mercapto radicals, —SR; where R is a hydrocarbyl radical having from 1 to 20 carbon atoms. The compositions of the present invention have utility as biological compounds, such as insecticides, fungicides, and herbicides, as well as in the eradication of vermin.

---

The present invention relates to novel substituted arsenic-compounds containing oxygen or sulfur. It is an object of the invention to prepare certain novel compounds containing arsenic and oxygen or sulfur and existing as polymeric compounds.

The compounds contemplated in the present invention have the general over-all composition $$(AsY_{x/2}X_y)_m$$

where $x$ and $y$ are positive numbers, $m$ is an integer from 2 to 1000, and $x+y=3$. In the above formula Y is selected from the group consisting of oxygen and sulfur, X is a radical selected from the group consisting of the halogens such as fluorine, chlorine, bromine and iodine; alkoxy radicals, —OR; dialkyl amine radicals, —$NR_2$; and mercapto radicals, —SR, where R is a hydrocarbyl radicals having from 1 to 20 carbon atoms such as alkyl, cycloalkyl and aromatic (6–20 carbon atom) radicals.

The general method for the preparation of the present compounds is by the agitation together of $$As_2O_3 \text{ or } As_2S_3$$

and a modifying arsenic source $AsX_3$, where X has the meaning set forth above.

The ratio between the starting components e.g., the arsenic oxide or sulfide compound and the modifying arsenic compound is broadly in the molar proportion of from 100:1 to 1:100, with certain ratios giving higher polymeric products. Polymeric forms of the present compositions, e.g., having from 2 to 1000 arsenic atoms per molecule are obtained when using a range of mole proportions of 0.001 to 10.0 moles of the arsenic modifying compound $AsX_3$ relative to a mole of the arsenic sulfide or oxide. The lower portion of this range favors the production of the highest molecular weight products.

The general classes of specific products obtained in the practice of the present invention, and falling within the above general formula (with the central —O— or —S— radical being represented by Y) existing as a linear, and branched chain structure are as follows:

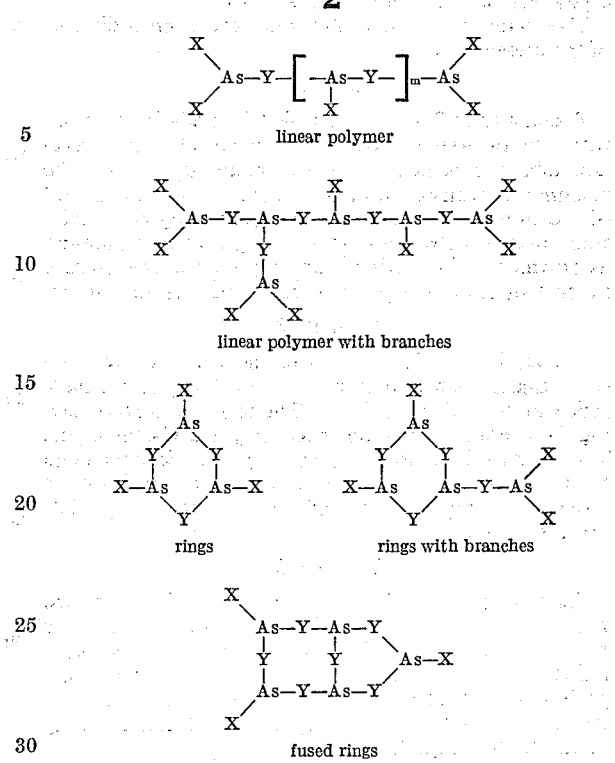

The general procedure for the preparation of the present compounds is to agitate a mixture of the respective components, for example, the compound $As_2O_3$ or $As_2S_3$ together with an arsenic source $AsX_3$, as described above, for example, arsenic trifluoride, in the desired proportion, such as 1:5 (molar) and with the mixture maintained at a temperature in the range of from 0° C. to 150° C. A solvent is not necessary, although it is possible to operate in the presence of a hydrocarbon solvent e.g., benzene, toluene, pentane or decane solvent or a halocarbon solvent such as carbon tetrachloride, hexafluoroethane, etc. The pressure is not a controlling variable so that the reaction may be conducted under vacuum or pressure conditions. However, it is desirable to conduct the reaction in a sealed tube or under an inert gas atmosphere for example nitrogen or argon. The general method is as follows: Depending on the equilibrium composition desired, from 3.3 g. to 0.2 g. of arsenic trifluoride and from 0.2 g. to 2.0 arsenic sulfide or trioxide (mole ratio of 0.2 to 20 relative to the $A_2S_3$ or $As_2O_3$) are accurately weighed into 5 mm. I.D. thick-walled Pyrex tubes which are previously kept in an over to remove sorbed water and are then flushed with pure, dry nitrogen. The tubes are sealed and then heated for 8 hr. at 130° C. The contents of each tube are completely homogeneous under these conditions. After heating, the tubes are rapidly cooled to 0° C. and are then opened. This operation should be conducted in a hood, being careful to avoid contact of the products with the operator's skin, such as by the use of rubber gloves or a dry box. The low temperature may result in the appearance of a solid phase of the product which can be removed. If desired the sample tubes are carefully warmed until the contents are again homogeneous. A portion of the contents are transferred directly into a precision-bore, thin-walled tube and investigated by fluorine nuclear magnetic resonance. The remaining material is used in a dilute form favoring N.M.R. resolution by dissolving the sample in three parts of toluene and the resulting solution transferred into another N.M.R. tube and also investigated by fluorine nuclear magnetic resonance. The system is found to attain equilibrium rapidly, e.g., upon dissolution of the $As_2O_3$ or $As_2S_3$. The separation of the individual species of molecules in the product can be effected by low temperature chromatography or by low temperature crystallization e.g. from pentane at −78° C.

The following examples illustrate specific embodiments of the present invention.

Example 1

A quantity of 2.64 g. of arsenic trifluoride is combined with 3.96 of arsenic trioxide (1:1 mole ratio) in a reaction tube and heated for several hours at 120° C. The resulting polymeric reaction product is a viscous oil of the overall composition AsOF, containing an equilibrium mixture of various —O— bridged arsenic fluorides as polymer chains having branching points. The average number of As atoms per molecule ranges from 5 to 15.

Example 2

A quantity of 1.32 g. of arsenic fluoride dissolved in 5 cc. of toluene is heated with 3.96 g. of $As_2O_3$ (0.5:1 mole ratio) at 160° C. for 2 hours. The reaction mixture having the overall composition $AsO_{1.2}F_{0.6}$ is a viscous liquid. The product is a branched chain polymeric compound having a viscosity of $10^6$ poises at 60° C., indicating a considerably higher degree of polymerization, e.g. 100–500 As per molecule.

Example 3

An amount of 12.65 g. of arsenic trichloride is reacted with 3.96 g. of arsenic trioxide (3.5:1 mole ratio) in a reaction flask maintained at 130° C. under refluxing conditions with the condenser vented to the atmosphere and protected from moisture. The resulting product has an overall composition of $AsO_{0.55}Cl_{1.9}$ and consists mainly of the species $Cl_2AsOAsCl_2$.

Example 4

A quantity of 12.6 g. of arsenic tribromide is mixed with 3.96 g. of arsenic trioxide (2:1 mole ratio) and heated at 120° C. for 10 hours. The resulting viscous reaction product has the overall composition $AsO_{0.75}Br_{1.5}$, and is a linear polymer with branching groups with the average number of As atoms per molecule ranging from 10 to 25.

Example 5

A 22.8 g. sample of arsenic triiodide is heated together at 150° C. with 3.96 g. of $As_2O_3$ (3:1 mole ratio) in a hydrocarbon solvent. After removal of the solvent the residue shows the overall composition $AsO_{0.67}I_{1.67}$ and is a chain polymer with branching points with the average number of As atoms per molecule ranging from 8 to 20.

Example 6

A quantity of 2.52 g. of trimethylarsenite is combined with 3.95 g. of $As_2O_3$ (0.75:1 mole ratio) in a reaction tube and heated for several hours at 130° C. The resulting reaction mixture is a viscous liquid with the overall composition $AsO_{1.09}(OCH_3)_{0.82}$. The product is a cross-linked polymer having 25 to 100 As atoms per molecule.

Example 7

An amount of 12.42 g. of trisdimethylaminoarsine is mixed with 3.95 g. of $As_2O_3$ (3:1 mole ratio) and heated at 100° C. over a period of 10 hours. The resulting reaction product analyzes as $AsO_{0.6}[N(CH_3)_2]_{1.8}$ and consists mainly of the linear species having from 2 to 8 As atoms per molecule.

Example 8

A quantity of 12.42 g. of trisdimethylaminoarsine is mixed with 4.92 g. of $As_2S_3$ (3:1 mole ratio) and heated at 100° C. over a period of 24 hours. The resulting viscous reaction product analyzes as $AsS_{0.6}[N(CH_3)_2]_{1.8}$ and is a polymer with the average number of As atoms per molecule ranging from 2 to 10.

Example 9

An amount of 8.32 g. of trisdimethylaminoarsine is heated with 4.92 g. of $As_2S_3$ (2:1 mole ratio) at 150° C. over a period of 24 hours. The resulting viscous product has an overall composition $AsS_{0.75}[N(CH_3)_2]_{1.5}$ with an average number of As atoms per molecule ranging from 10 to 50.

The compounds of the present invention have utility using suitable precautions as biological compounds such as insecticides, fungicides and herbicides, as well as in the eradication of vermin, such as rats. The compounds should be handled with the use of conventional protective equipment such as rubber gloves, masks, and suitable protective clothing.

What is claimed is:

1. Polymeric arsenic compounds having the formula $$(AsY_{x/2}X_y)_m$$

where $x$ and $y$ are positive numbers, $m$ is an integer from 2 to 1000, and $x+y=3$, Y is selected from the group consisting of oxygen and sulfur, and X is selected from the group consisting of fluorine, chlorine, bromine and iodine; alkoxy radicals, —OR; dialkyl amine radicals, —NR₂; and mercapto radicals, —SR; where R is a hydrocarbyl radical having from 1 to 20 carbon atoms.

2. As a composition of matter, polymeric $(AsOF)_m$ where $m$ is an integer from 2 to 1000.

3. As a composition of matter, polymeric $(AsO_{1.2}F_{0.6})_m$ where $m$ is an integer from 2 to 1000.

4. As a composition of matter, polymeric $$(AsO_{0.55}Cl_{1.9})_m$$

where $m$ is an integer from 2 to 1000.

5. As a composition of matter, polymeric $$(AsO_{0.75}Br_{1.5})_m$$

where $m$ is an integer from 2 to 1000.

6. As a composition of matter, polymeric $$(AsO_{0.67}I_{1.67})_m$$

where $m$ is an integer from 2 to 1000.

7. As a composition of matter, polymeric $$[AsO_{1.09}(OCH_3)_{0.82}]_m$$

where $m$ is an integer from 2 to 1000.

8. As a composition of matter, polymer $$[AsO_{0.6}[N(CH_3)_2]_{1.8}]_m$$

where $m$ is an integer from 2 to 1000.

9. As a composition of matter, polymeric $$[AsS_{0.6}[N(CH_3)_2]_{1.8}]_m$$

where $m$ is an integer from 2 to 1000.

10. As a composition of matter, polymeric $$[AsS_{0.75}[N(CH_3)_2]_{1.5}]_m$$

where $m$ is an integer from 2 to 1000.

11. Process for the preparation of polymers having the formula $$(AsY_{x/2}X_y)_m$$

where $x$ and $y$ are positive numbers, $m$ is an integer from 2 to 1000 and $x+y=3$, Y is selected from the group consisting of oxygen and sulfur, and X is selected from the group consisting of fluorine, chlorine, bromine and iodine; alkoxy radicals, —OR; dialkyl amine radicals, —NR₂; and mercapto radicals, —SR; where R is an alkyl radical having from 1 to 20 carbon atoms, which comprises agitating together an arsenic compound having the formula $ASX_3$ with $As_2Y_3$ in the mole range of 0.001:1 to 10:1, at a temperature of from 0° C. to 150° C., and thereafter separating the polymeric $(AsY_{x/2}X_y)_m$.

12. Process for the preparation of polymeric $[AsOF]_m$ where $m$ is an integer from 2 to 1000 which comprises agitating together, $AsF_3$ with $As_2O_3$ in the mole proportion of about 1:1 at a temperature of from 0° C. to 150° C., and thereafter separating the said polymer.

13. Process for the preparation of polymeric $$[AsO_{1.2}F_{0.6}]_m$$

where $m$ is an integer from 2 to 1000, which comprises agitating together $AsF_3$ together with $As_2O_3$ in the mole ratio of about 0.5:1 at a temperature of from 0° to 150° C., and thereafter separating the said polymer.

14. Process for the preparation of polymeric $$[AsO_{1.55}Cl_{1.9}]_m$$

where $m$ is an integer from 2 to 1000, which comprises agitating $AsCl_3$ together with $As_2O_3$ in the mole ratio of about 3.5:1 at a temperature of from 0° C. to 150° C., and thereafter separating the said polymer.

15. Process for the preparation of polymeric $$[AsO_{0.75}Br_{1.5}]_m$$

where $m$ is an integer from 2 to 1000, which comprises agitating together $AsBr_3$ with $As_2O_3$ in the mole proportion of about 2:1 at a temperature of from 0° C. to 150° C., and thereafter separating the said polymer.

16. Process for the preparation of polymeric $$[AsO_{0.67}I_{1.67}]_m$$

where $m$ is an integer from 2 to 1000, which comprises agitating together $AsI_3$ with $As_2O_3$ in the mole proportion of about 3:1 at a temperature of from 0° C. to 150° C., and thereafter separating the said polymer.

17. Process for the preparation of polymeric $$[AsO_{1.09}(OCH_3)_{0.82}]_m$$

where $m$ is an integer from 2 to 1000, which comprises agitating together $As(OCH_3)_3$ and $As_2O_3$ in the mole proportion of about 0.75:1 at a temperature of from 0° to 150° C., and thereafter separating the said polymer.

18. Process for the preparation of polymeric $$[AsO_{0.6}[N(CH_3)_2]_{1.8}]_m$$

where $m$ is an integer from 2 to 1000, which comprises agitating together $As[N(CH_3)_2]_3$ and $As_2O_3$ in the mole proportion of about 3:1 at a temperature of from 0° to 150° C., and thereafter separating the said polymer.

19. Process for the preparation of polymeric $$[AsS_{0.6}[N(CH_3)_2]_{1.8}]_m$$

where $m$ is an integer from 2 to 1000, which comprises agitating together $As[N(CH_3)_2]_3$ with $As_2S_3$ in the mole proportion of about 3:1 at a temperature of from 0° C. to 150° C., and thereafter separating the said polymer.

References Cited

Jander et al.: "Zeitschrift fur Anorganische und Allgemeine Chemie," vol. 302, November 1959, pp. 158–161.

EDWARD J. MEROS, *Primary Examiner.*

H. S. MILLER, *Assistant Examiner.*

UNITED STATES PATENT OFFICE
CERTIFICATE OF CORRECTION

Patent No. 3,394,992   Dated July 30, 1968

Inventor(s) John R. Van Wazer et al

It is certified that error appears in the above-identified patent and that said Letters Patent are hereby corrected as shown below:

Column 1, line 43, "radicals" should be -- radical --.

Column 2, lines 1-5, the formula

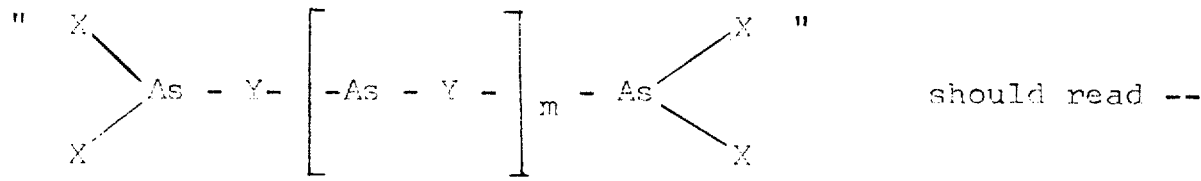   should read --

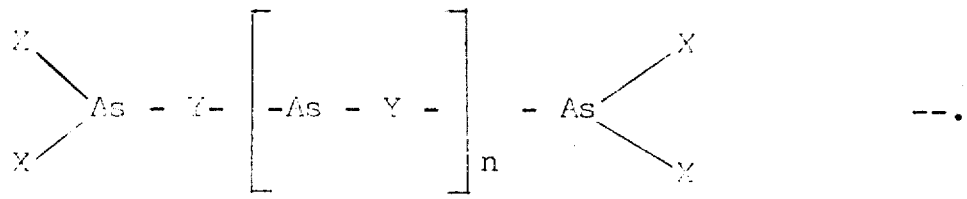   --.

Column 2, line 51, "I.D." should be -- i.d. --.

Column 2, line 53, "over" should be -- over --.

Column 2, lines 68 & 70, "N.M.R." should be -- n.m.r. --.

Column 4, line 39, the words "where m is an inter from 2 to 1000." first appearing before formula should be omitted.

Column 4, line 47, the word "polymer" should be -- polymeric --.

Column 5, line 11, the formula "$[AsO_{1.55}Cl_{1.9}]_m$" should be -- $[AsO_{0.55}Cl_{1.9}]_m$ --.

Column 6, line 5, "0°" should be -- 0°C --.

SIGNED AND
SEALED
JUN 23 1970

(SEAL)
Attest:

Edward M. Fletcher, Jr.
Attesting Officer

WILLIAM E. SCHUYLER,
Commissioner of Patents